(12) United States Patent
Pighin et al.

(10) Patent No.: US 9,342,912 B1
(45) Date of Patent: May 17, 2016

(54) ANIMATION CONTROL RETARGETING

(75) Inventors: Frederic P. Pighin, San Francisco, CA (US); Cary Phillips, Moss Beach, CA (US); Steve Sullivan, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 1130 days.

(21) Appl. No.: 11/759,140

(22) Filed: Jun. 6, 2007

(51) Int. Cl.
*G06T 13/00* (2011.01)
*G06T 13/40* (2011.01)

(52) U.S. Cl.
CPC ............... *G06T 13/00* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 5,649,086 | A | * | 7/1997 | Belfer et al. .................. 345/441 |
| 6,061,072 | A | | 5/2000 | Rouet et al. |
| 6,088,040 | A | * | 7/2000 | Oda et al. ...................... 345/473 |
| 6,130,679 | A | * | 10/2000 | Chen et al. .................... 345/473 |
| 6,606,095 | B1 | | 8/2003 | Lengyel et al. |
| 6,888,549 | B2 | | 5/2005 | Bregler et al. |
| 6,919,892 | B1 | | 7/2005 | Cheiky et al. |
| 7,006,881 | B1 | | 2/2006 | Hoffberg et al. |
| 7,027,054 | B1 | | 4/2006 | Cheiky et al. |
| 7,127,081 | B1 | * | 10/2006 | Erdem ............... G06K 9/00228 348/169 |
| 7,590,264 | B2 | | 9/2009 | Mattes et al. |
| 8,026,917 | B1 | * | 9/2011 | Rogers et al. .................. 345/473 |
| 2003/0146918 | A1 | * | 8/2003 | Wiles et al. .................... 345/582 |
| 2005/0057569 | A1 | * | 3/2005 | Berger .......................... 345/473 |
| 2005/0062743 | A1 | * | 3/2005 | Marschner et al. ........... 345/473 |
| 2005/0078124 | A1 | * | 4/2005 | Liu et al. ........................ 345/629 |
| 2006/0009978 | A1 | * | 1/2006 | Ma ................................ 704/266 |
| 2006/0087510 | A1 | * | 4/2006 | Adamo-Villani et al. .... 345/474 |
| 2009/0141986 | A1 | | 6/2009 | Boncyk et al. |

OTHER PUBLICATIONS

Pighin, F. et al., "Resynthesizing facial animation through 3D model based tracking", Computer Vision, 1999, The Proceedings of the Seventh IEEE International Conference on Vision ICCV '99, pp. 143-150, Sep. 20-27, 1999, Kerkyra, Greece, ISBN: 0-7695-0164-8.*

(Continued)

(Continued)

*Primary Examiner* — Maurice L McDowell, Jr.
*Assistant Examiner* — Donna J Ricks
(74) *Attorney, Agent, or Firm* — Kilpatrick Townsend & Stockton LLP

(57) ABSTRACT

The subject matter of this specification can be embodied in, among other things, a method that includes determining a transform of a portion of constituent components of a source shape. The transform includes one or more states for the portion of constituent components of the source shape. The method also includes accessing a mapping function that associates the one or more states with one or more controls for a target shape, where the one or more controls configured for access by a user for manipulating constituent components of the target shape. The method includes outputting a transform for the target shape based on the one or more controls associated with the transformed constituent components of the source shape.

23 Claims, 14 Drawing Sheets

(56) References Cited

OTHER PUBLICATIONS

"Flex Your Facial Muscles" by Jeff Landers, downloaded from http://www.gamasutra.com/features/20000414/lander_01.htm on Sep. 4, 2004, 7 pages.

"Deformation Transfer for Triangle Meshes" by R. Sumner et al., for Computer Science and Artificial Intelligence Laboratory Massachusetts Institute of Technology, copyright 2004, pp. 399-405.

"Facial Motion Retargeting" by Pighin et al., for Siggraph 2006 course notes Performance-driven Facial Animation, dated 2006, 9 pages.

"Analysis of co-articulation regions for performance-driven facial animation" by Fidaleo et al., for Computer Animation and Virtual Worlds, *Comp. Anim. Virtual Worlds 2004*; 15: 15-26 (DOI: 10.1002. cav.4) 12 pages.

"Construction and Animation of Anatomically Based Human Hand Models" by Albrecht et al., Eurographics/SIGGRAPH Symposium on Computer Animation 2003, pp. 98-109 and pp. 368.

Pyun et al., "An Example-Based Approach for Facial Expression Coning", Eurographics/SIGGRAPH 2003.

Pei et al., "Transferring of Speech Movements from Video to 3D Face Space", IEEE, Jan. 2007.

Anguelov et al., "SCAPE: Shape Completion and Animation of People", ACM 2006.

USPTO Office Action in U.S. Appl. No. 11/688,066, mailed Feb. 2, 2010, 18 pages.

* cited by examiner

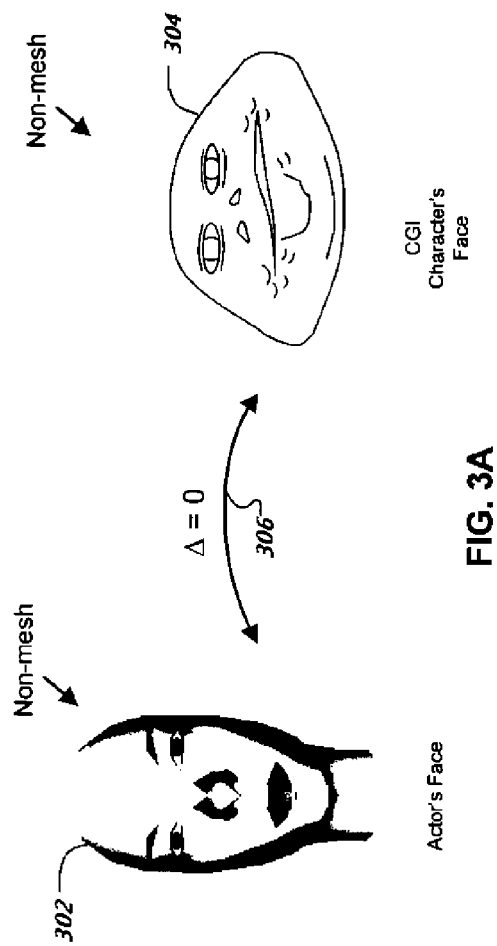
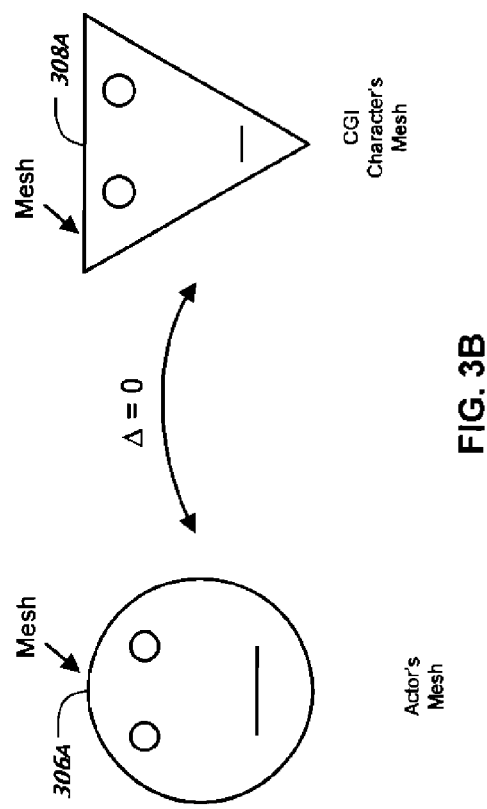
FIG. 3A
FIG. 3B

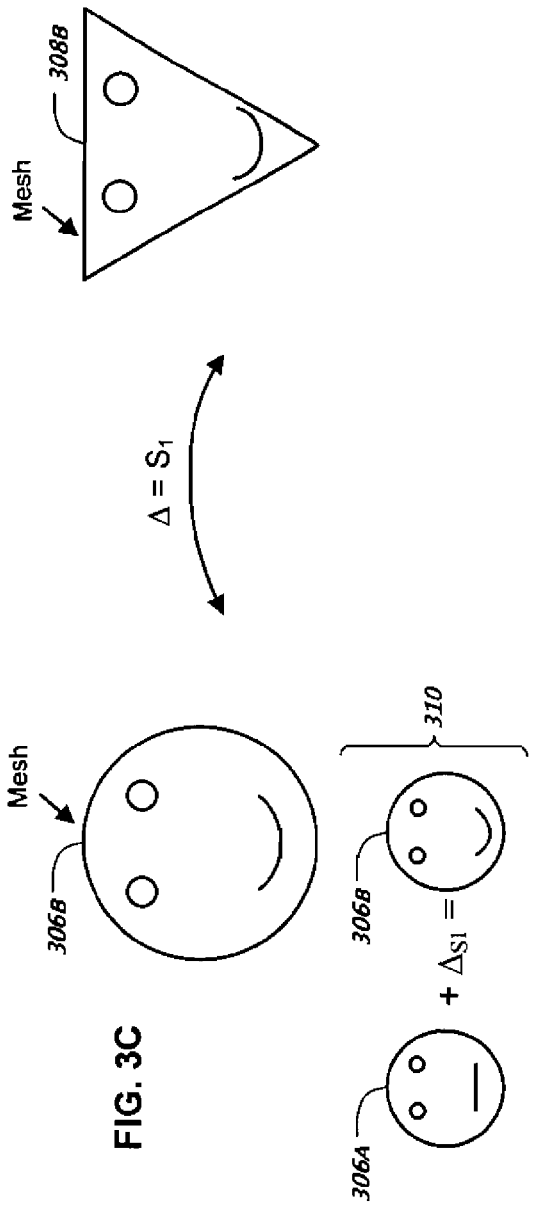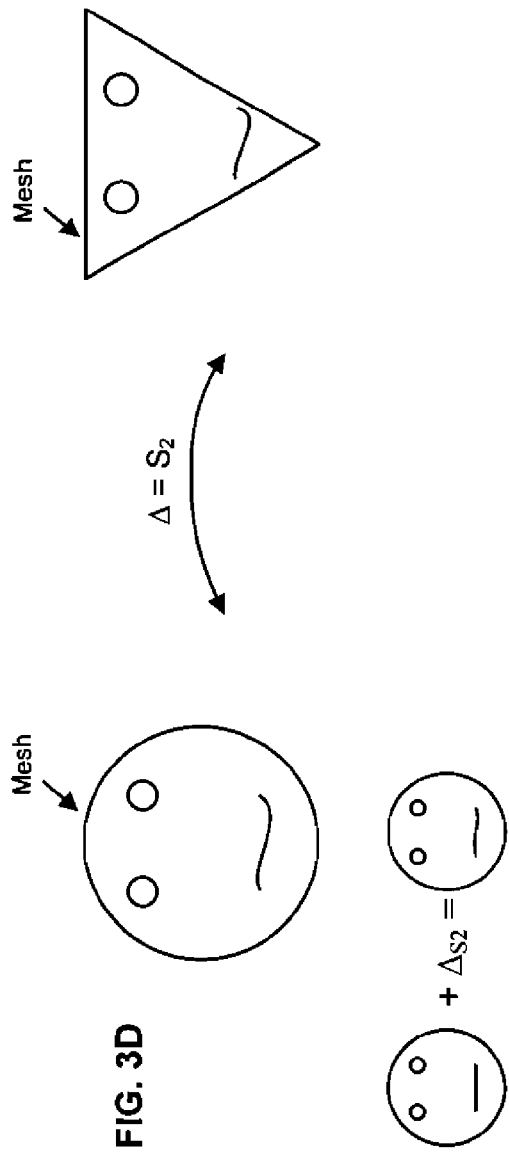

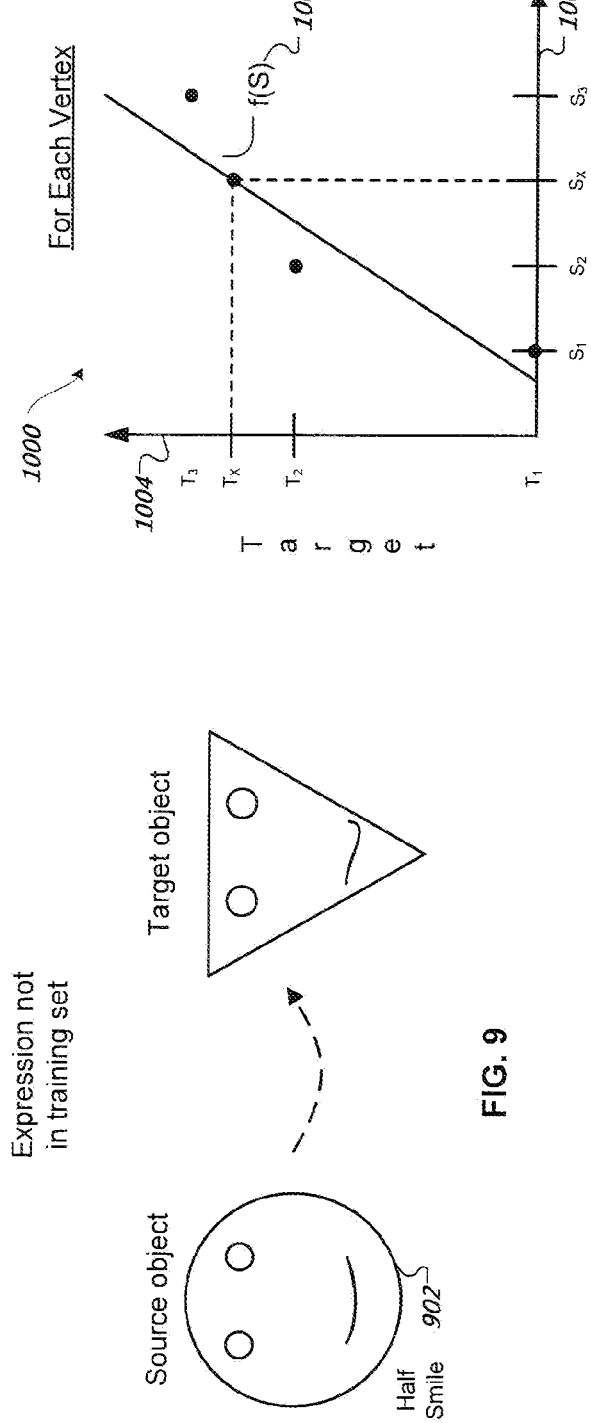

| Vertices / Geometry State | Mapping Function | Controls |
|---|---|---|
| StateA | f(StateA) | K₁MuscleA |
| StateB + StateC | f(StateB + StateC) | K₂MuscleB |
| ... | ... | ... |

FIG. 11

ID RETARGETING

TECHNICAL FIELD

Implementations are described, which relate to relate to computer animation, and, more particularly, to animation retargeting.

BACKGROUND

Motion capture technology can be used to record an object's movement, such as an actor's facial motion. The recorded performance can then be used to animate a computer-generated character's face. If the character's face differs from the actor's face, the actor's facial motions can be adapted or retargeted to the proportions and personality of the character's face.

SUMMARY

In general, systems and methods for animating a target object based on a source object are described.

In a first general aspect, system and methods are described, which create a mapping of a transform from a space of a source object (e.g., source facial expressions) to a space of a target object (e.g., target facial expressions). In certain implementations, the mapping is learned based on a training set composed of corresponding shapes (e.g. facial expressions) in each space. The user can create the training set by selecting expressions from, for example, captured source performance data, and by sculpting corresponding target expressions. Additional target shapes (e.g., target facial expressions) can be interpolated and extrapolated from the shapes in the training set to generate corresponding shapes for potential source shapes (e.g., facial expressions).

In a second general aspect, an animation mapping method is described. The method includes mapping a transform of a source shape to a target shape. The mapping is based on a training set of previous associations between the source and target shapes. The method also includes applying the mapped transform to the target shape for output of an initial mapping to a user, and modifying the training set to generate a refined mapping of the transform applied to the target shape.

In another general aspect, a method is described, which includes outputting an initial mapping of a transform from a source shape to a target shape and iteratively receiving feedback from a user and adjusting the mapping of the transform based on the feedback.

In yet another general aspect, a computer-implemented method for mapping a transform from a source shape to a target object is described. The method includes associating first and second positions of a source object with corresponding first and second positions of a target object. The positions are at least partially defined by a mesh comprising vertices. The method also includes generating, based on the associations, a mapping between a third position of the source object and a third position of the target object. The mapping comprises an affine transformation based on a transform of selected vertices of the source object relative to local vertices within a predetermined distance from vertices selected for transformation.

In another general aspect, a method of generating animation is described. The method includes generating a mapping between a source mesh and a target mesh based on previous mappings. Generating the mapping includes applying an affine transformation to transforms of one or more vertices of the source mesh, wherein the transforms are relative to a neighborhood of vertices a predetermined distance from the one or more vertices being transformed.

In another general aspect, a method of generating animation is described. The method includes selecting a point on a target object to reflect a transform of a corresponding point on a source object, identifying a first neighborhood of geometric shapes that are a predetermined distance from the point on the target object and associating the first neighborhood with a corresponding second neighborhood of geometric shapes on the source object, and determining an affine mapping for a transform of the point on the target object relative to the first neighborhood based on a transform of the corresponding point on the source object relative to the second neighborhood.

In another general aspect, a system is described. The system includes a mapping function generator for mapping a transform of a source shape to a target shape. The mapping is based on a training set of previous associations between the source and target shapes. The system also includes an interface for receiving modifications, based on user input received in response to an output of the mapping, to the training set for generating a refined mapping of the transform applied to the target shape.

In another general aspect, a computer-implemented method for animation is described. The method includes determining a transform of a portion of constituent components of a source shape. The transform includes one or more states for the portion of constituent components of the source shape. The method also includes accessing a mapping function that associates the one or more states with one or more controls for a target shape, where the one or more controls are configured for access by a user for manipulating constituent components of the target shape. The method includes outputting a transform for the target shape based on the one or more controls associated with the transformed constituent components of the source shape.

In yet another general aspect, a system for animating shapes is described. The system includes a transform receiver module to determine a transform of a portion of constituent components of a source shape. The transform includes states for the portion of constituent components of the source shape. The system also includes a source-to-target mapper to access a mapping function that associates the states with controls for a target shape. The controls are configured for access by a user for manipulating constituent components of the target shape. The system includes an interface to output a transform of a portion of the controls based on the transform of the constituent components of the source shape.

In another general aspect, a method for animating shapes is described. The method includes receiving a first positional state for a source shape that comprises vertices, wherein the first positional state is based on positions of the vertices, and accessing an association between the first positional state and controls for a target shape. The controls are configured to permit a user to manipulate the target shape by controlling groups of related vertices of the target shape. The method also includes generating a second positional state for the target shape that corresponds to the first positional state based on the association.

The systems and techniques described here may provide one or more of the following advantages. First, a system can provide an accurate method to map a transform from a source object to a target object. Second, a system can increase retargeting accuracy by mapping a transform based on a local neighborhood around a point of interest, where the neighborhood is defined by an edge distance from the point of interest. Third, a system can provide a user interface for visualizing a result of a mapped transform. Fourth, a system provides a user interface for controlling and incrementally creating mapping between source and target objects. Fifth, a system increase the ability to map complex motion by working directly in the space of data associated with a source object.

Implementations of the systems and methods are set forth in the accompanying drawings and the description below. Other features and advantages of the described systems and methods will be apparent from the description and drawings, and from the claims.

DESCRIPTION OF DRAWINGS

FIGS. 3A-D are examples of corresponding source and target objects mapped with the system of FIG. 1.

FIG. 9 is an example of dynamically mapping previously unmapped movements between the source and target objects.

FIG. 10 is an example graph illustrating an interpolation of previous mappings to generate new mappings between the source and target objects.

FIG. 11 is an example of information used for mapping a source object's geometry to a target object's controls.

Like reference symbols in the various drawings indicate like elements.

DETAILED DESCRIPTION

Animating a digital character can be a costly and tedious task. In certain implementations, reusing motions produced for a source character to animate a target character can save a significant amount of time and effort.

Illustrious systems and techniques are described that map, or retarget, movement from a source object, such as motion capture data associated with an actor's face, to a target object, such as computer-generated character's face. If the computer-generated character's face differs from the actor's face, the movement of the actor's face can be adapted or retargeted to the proportions and personality of the character's face.

For example, an actor may smile; however, this movement may be difficult to translate directly to the character because the character's mouth could be, for example, twice as large as the actor's mouth. The system permits the actor's mouth be mapped to the larger character's mouth in a way that when the actor smiles the character performs a corresponding smile.

Certain implementations described below can create a mapping from a space of the source object (e.g. a source's facial expressions) to a space of the target object (e.g., a target's facial expressions).

In certain implementations, dynamic mappings can be learned based on a training set that includes corresponding positions for the source and target objects, such as corresponding facial expressions, in each space. A user can create the training set by selecting positions, or expressions, from a motion captured source performance (e.g., an actor's performance) and explicitly sculpting corresponding target expressions. The systems and methods described can interpolate/extrapolate the corresponding expressions for source expressions that are not present in the training set.

The system can provide a user interface (UI) that allows a user, such as an animation artist, to specify factors that influence how the source object is mapped to the target object. In some implementations, a user can immediately visualize the movement applied to the target object, and the user can modify one or more factors to refine the mapping. The systems and methods are described in more detail below.

Figure 1:
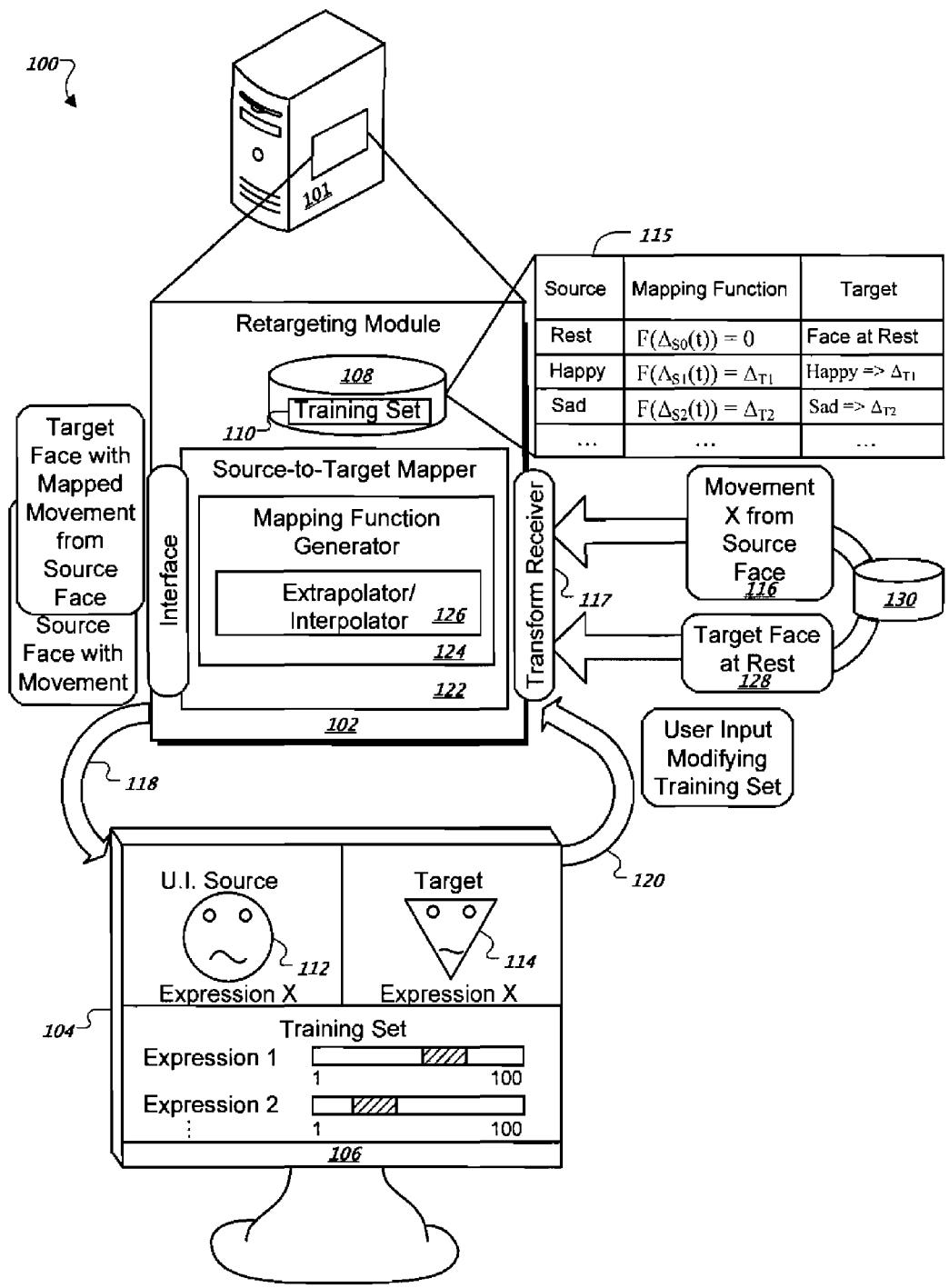
FIG. 1 is an example schematic diagram of a system for mapping movement from a source object to a target object.

FIG. 1 is an example schematic diagram of a system 100 for mapping movement from a source object 112 to a target object 114. The system 100 includes a computing device 101 having a retargeting module 102 and a display 104 for presenting a user interface (UI) 106.

The retargeting module 102 includes a first database 108 that stores a training set 110 of mappings between the source and target objects. The retargeting module 102 can use the training set 110 to derive new mappings of movements between the source and target objects. In some implementations, the training set 110 can be stored in a data structure, such as a table 115, that includes sets of corresponding object positions, such as facial expressions, for the source and target objects.

The retargeting module 102 can receive information 116 specifying a movement of the source object relative to a baseline position of the source object and information 128 specifying a baseline position of the target object. In certain implementations, the information 116 and 128 can be received by a transform receiver 117, which uses the information to determine a transform of constituent components of the source shape. For example, the transform can include determining a displacement of the constituent components specified by the movement information, where the displacement is measured relative to the position of the constituent components in a baseline position of the source shape (not shown).

For the purposes of illustration, the baseline position used in the description will be a neutral, or at-rest, position. The retargeting module 102 can map a movement corresponding to the movement for the source object to the at-rest position of the target object.

For example, the information 116 can specify a change in movement, or a movement delta, from a source at-rest expression, such as an actor's face at rest, to a second expression, such as an actor smiling. The retargeting module 102 can transform, or retarget, the movement delta for application to the at-rest position of the target object (e.g., a character's face in a rest position). When the retargeting module 102 transforms and applies the delta movement to the at-rest expression of the character, the character appears to smile because the delta movement includes information specifying movement from the at-rest position to a smiling expression.

In certain implementations, information used to describe the geometry and movement of the source object can be captured using motion capture cameras (not shown) that film an object, such as an actor. In some implementations, the information captured by the motion capture cameras can be displayed using a three-dimensional mesh that specifies the position of the object using the vertices linked by edges.

In certain implementations, the source object 112 and the corresponding target object 114 can be displayed on the UI 106 (as indicated by arrow 118) by a display device 104, such as a monitor. The displayed source object 112 may have a first expression, and the displayed target object 114 may have a corresponding first expression. A user can influence the mapping of the source movement delta to the target object by inputting values that affect the training set used to derive mapping functions between the source and target objects, which is indicated by arrow 120.

After the receiving the user input, the retargeting module 102 can remap the source movement delta to the target object, and display the refined mapping to the user. The user may iteratively adjust the mapping of the movement based on the displayed mapping until the user is satisfied with the displayed mapping.

The retargeting module 102 can include a source-to-target mapper 122, which performs the mapping between the source and target objects. The source-to-target mapper 122, in turn, may include a mapping function generator 124 that uses mapping samples in the training set 108 to derive additional mappings for previously unmapped expressions.

In certain implementations, the mapping function generator 124 can include an extrapolator/interpolator 126 that extrapolates or interpolates the mapping samples stored in the training set 110 to derive the additional mappings for previously unmapped expressions.

Additionally, information, such as the training set, the source delta movement, and the mapping functions can be stored in the database 108. In other implementations, the information may be stored in separate databases, which can be external to the computing device 101. For ease of illustration, FIG. 1 shows information 116 specifying the source delta movement and information 128 specifying the at-rest position of the target object stored in a separate database 130, but this example is not intended to limit where the various information is stored within the system 100.

Figure 2:
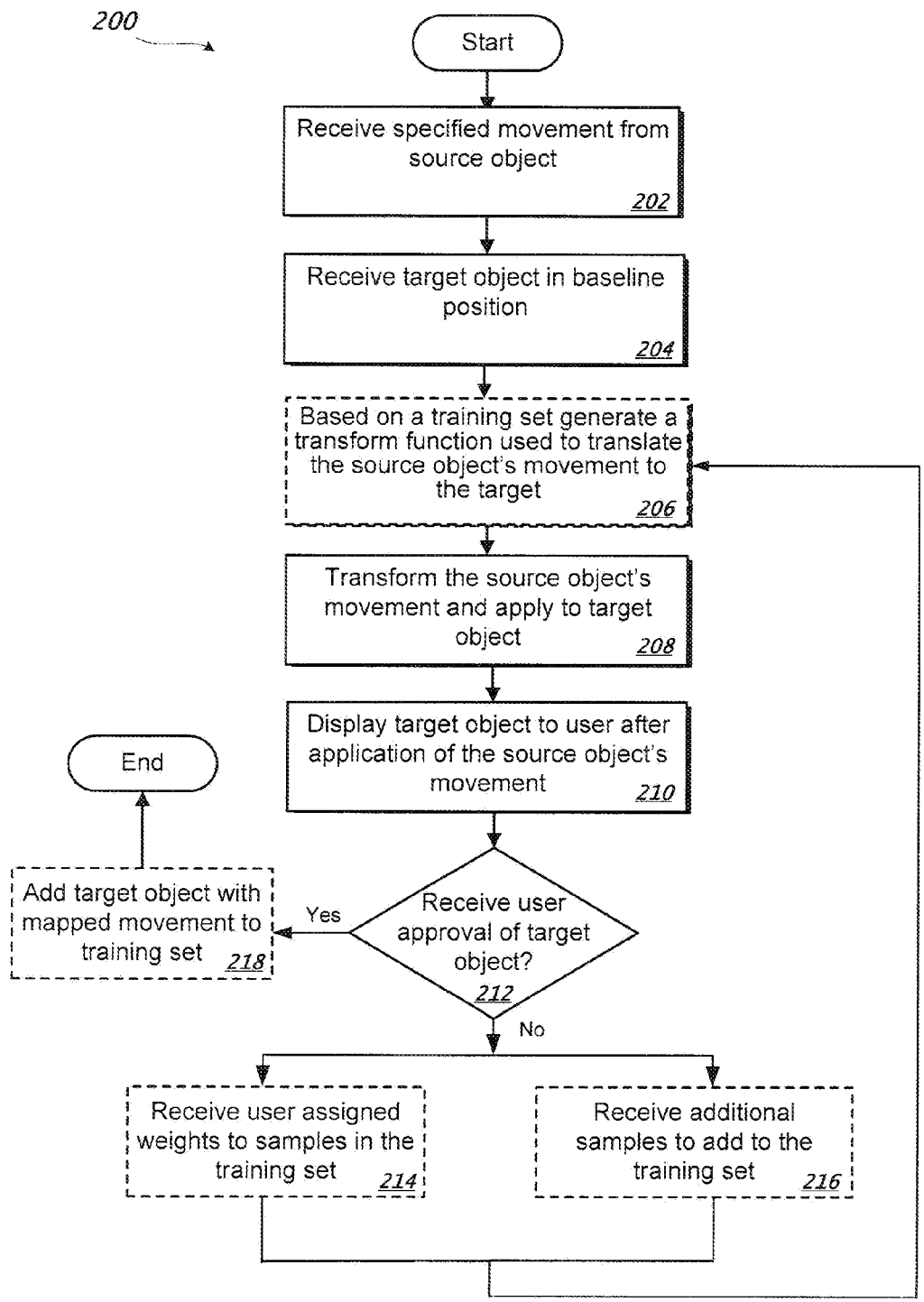
FIG. 2 is a flowchart of an example method for mapping movement from the source object to the target object.

FIG. 2 is a flowchart of an example method 200 for mapping movement from the source object 112 to the target object 114. For example, if the source object is a face that smiles, the smiling movement is mapped to the target object.

At step 202, information specifying a movement of a source object is received. For example, the movement may be specified by a set of vectors that describe one or multiple movements of an actor's face. In some implementations, the vectors specify the movement of a portion of the source object from an at-rest position to a first expression (e.g., happy, sad, angry, etc.). At step 204, information specifying the target object in an at-rest position is received.

At step 206, a transformation function is generated based on the training set. In certain implementations, the transform function is an affine transformation that is derived by interpolating or extrapolating previous affine transformations used to map movements from the source object to the target object. For example, the training set can include affine mappings between the source and target objects. These mappings may be used to interpolate or extrapolate a new mapping between the source and target object.

At step 208, the source object's movement can be applied to the target object. Vectors specifying the source object's movement can be modified for application on the target object if the target and source objects differ in geometry. For example, an affine transformation generated at step 206 can modify the source object's movement vectors. The transformed movement vectors can then be applied to the target object.

For example, the retargeting module 102 can apply the transformed movement vectors to the target object with a neutral expression. The transform movement vectors specify how the target object should move relative to the neutral expression.

At step 210, the target object is displayed to a user. The retargeting module 102 can output the target object with the source movement applied so that a user can visually inspect the mapping performed by the retargeting module. The retargeting module 102 may also display the source object with the corresponding movement applied so that the user can compare the expression of the source object with the expression of the target object.

At step 212, a determination is made whether the user approves of the mapping performed on the target object. In some applications, the automatic mapping performed by the retargeting module 102 may be manually refined. For example, the target object may have a particular way of smiling where the left side of the mouth curls a downward. When the retargeting module 102 maps a movement of the source target smiling, movement which causes both sides of the mouth to curve upward may be applied to the target object. A user may desire to refine the mapping so that left side of the target objects mouth curls downward. If the user does not approve of the mapping applied to the target object the method 200 can move to optional steps 214 and 216.

At optional step 214, weights may be assigned to samples in the training set in order to refine the mapping of the movement from the source object to the target object. For example, one of the mapped expressions in the training set may be an expression in which the target and source objects are smirking with the left side of the mouth curling downward. The user may assign a weight to this expression so that the sample contributes more heavily to the mapping then other samples.

In some implementations, the user may specify the weight for an expression through the user interface 106 by adjusting a slider bar associated with the expression, as shown in FIG. 1. In other implementations, the user may enter a percentage of contribution a particular sample should contribute. For example, a user may specify that a happy expression should contribute 30 percent and an angry expression should contribute 70 percent.

At optional step 216, additional samples can be added to the training set. For example, the user may explicitly map the source object's smiling movement to a smiling movement for the target object where the mouth is curled downward on the left side.

After the user has refined the influence and/or samples of the training set, the retargeting module 102 may generate the transform function using the modified training set, as shown in the step 206.

If the user approves of the mapping applied to the target object, optional step 218 can be performed. At the step 218, the target object with the mapped movement can be added to the training set. After this step, the method 200 can end.

In some implementations, the steps 206-214 are optional. Instead, the user explicitly sculpts corresponding positions for the target object based on the source object. These mappings can then be added to the training set and used to derive additional mappings for the training set, or for dynamically generated mappings, which is discussed more in association with FIGS. 9 and 10.

FIGS. 3A-D are examples of corresponding source and target objects mapped with the system 100 of FIG. 1. FIG. 3A shows motion capture data of an actor's face 302 with a neutral, or at rest, expression. Also shown, is a computer-generated character's face 304 with a corresponding neutral, or at-rest expression. The expressions are mapped to each other as indicated by arrow 306.

In some implementations, the value that is mapped from the actor face 302 to the characters face 304 is a delta, or change, in movement between an at-rest expression and a second expression. In FIG. 3A the delta is zero because the expression being mapped is the at-rest expression, and consequently, there is no movement to map.

FIG. 3B shows mesh representations of the source and target objects shown in FIG. 3A. A user can manually map the source and target positions, for example, by associating vertices in actor's mesh 306A with corresponding vertices in the character's mesh 308A. For instance, the user can associate a vertex at the corner of the mouth of the actor's mesh 306A with one or more vertices at the corner of the mouth of the character's mesh 308A.

In other implementations, the user may associate other features of the source and target meshes, such as source and target polygons formed by vertices and connecting edges of the source and target meshes, respectively.

FIG. 3C shows mesh representations of the source and target objects in a smiling position, or expression. In certain implementations, the smiling actor's mesh 306B is expressed as the at-rest mesh actor 306A shown in FIG. 3B plus a $\Delta s_1$, which expresses a displacement of the actor's mesh relative to the at-rest actor's mesh 306A, as indicated by 310. The retargeting module 102 can the map $\Delta s_1$ to the target object to generate the smiling character mesh 308B.

For example, the position of the vertices of the smiling actor's mesh relative to the actor's at-rest mesh (i.e., the displacement or $\Delta s_1$) can be associated with the position of the smiling character's mesh relative to the character's at-rest mesh. In some implementations, a user, such as an animation artist, may link portions of the meshes together so that a smiling expression for the source object is associated with a smiling expression for the target object.

FIG. 3D shows an association between a worried expression on the source object and a worried expression on the target object. The movement used to generate the worried expression for the source object may be expressed as $\Delta s_2$, which is mapped to the target object in a substantially similar method as described for FIG. 3C.

Figures 4, 5:
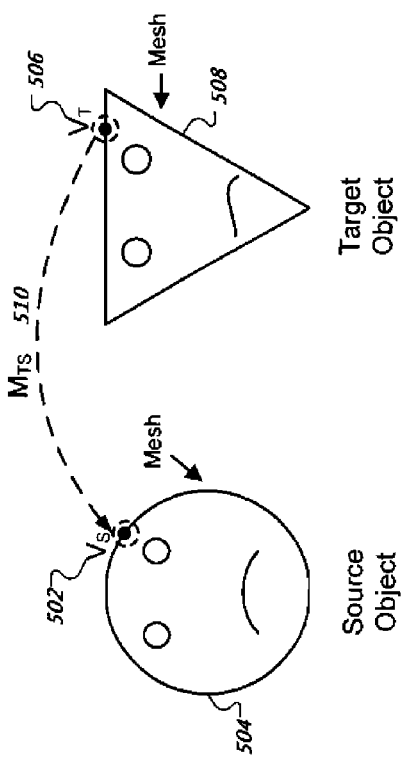
FIG. 4 is an example table that stores data used for mapping movement from a source to a target object.
FIG. 5 is an example of corresponding vertices from the source and target objects mapped with a system of FIG. 1.

FIG. 4 is an example table 400 that stores data used for mapping movement from the source object to the target object. For example, the table 400 may be one way to implement the table 115 of FIG. 1. The table 400 includes a source column 402, a target column 404, and a mapping function column 406.

The source column includes rows of values, each of which specify a displacement of a vertex (or other mesh component) relative to an at-rest position of that vertex. For example, $\delta_s(V_{S0}, t)$ 408 specifies the displacement $\delta$ of an individual vertex $V_{S0}$ on the source mesh with respect to time (t).

The composite displacement of a plurality of vertices on the source can form an expression for the source object, such as the expression "Sad $\Delta s$" 410, where the $\Delta s$ signifies the composite displacement of the vertices from a neutral expression. Similarly, other expressions, such as "Happy $\Delta s$" 412 can include specified displacements for vertices within the source mesh.

The target column 404 includes values specifying displacement of vertices in the target mesh. For illustrative purposes displacements for vertices in the source mesh and corresponding displacements for vertices in the target mesh are shown in the same row. For example, the source vertex displacement 408 can specify the movement of a vertex at the corner of a right eye on the actor's mesh. The corresponding target vertex displacement 414 specifies the movement of a corresponding vertex (or vertices) at the corner of a right eye on the character's mesh.

Information illustrated in the table 400 can be used to compute a function $\Delta_T$ that maps vertices on the target mesh onto displacements of the source mesh at a given time (t).

The mapping function column 406 includes functions that describe how target vertices are mapped to corresponding locations on a source.

More specifically, as shown in the table 400, $V_{Ti}$, such as $\rm V_{T\!,1}$ 414, is an arbitrary vertex on the target mesh, and MTS, such as MTS($V_{Ti}$,t) 416, is a function that maps target vertices onto corresponding locations on the source mesh. As such, MTS($V_{Ti}$) is the location on the source mesh that corresponds to the target vertex $V_{Ti}$.

Furthermore, in the table 400, $\Delta_S$ is a function that maps source locations onto an animation, or displacement, at a given time (t). Hence, $\delta_S(MTS(V_{Ti}), t)$ is the source displacement that corresponds to the target vertex $V_{Ti}$. "Retarget" is a function that maps source displacements onto target displacements.

In summary:

$$\delta_T(V_{Ti},t)=\text{Retarget}[\delta_S(MTS(V_{Ti}),t)]$$

Note that the function:

$$\delta_T(V_{Ti},t)=\delta_S(MTS(V_{Ti}),t)$$

would produce displacements for the target vertices by re-sampling the displacements on the source mesh. Whereas, $$\text{Retarget}[\delta_S(MTS(V_{Ti}),t)]$$

adapts the source displacements to the target vertices.

The mapping of the movement for individual vertices is described more in association with FIG. 5.

FIG. 5 is an example of corresponding vertices from the source and target objects mapped with a system of FIG. 1. As shown in the example, a vertex $V_T$ 506 on a target object 508 is associated with a vertex $V_s$ 502 on the source object 504. This association is described by $M_{TS}$, which specifies which target vertex (or set of vertices) is associated with which source vertex (or set of vertices).

Figure 6:
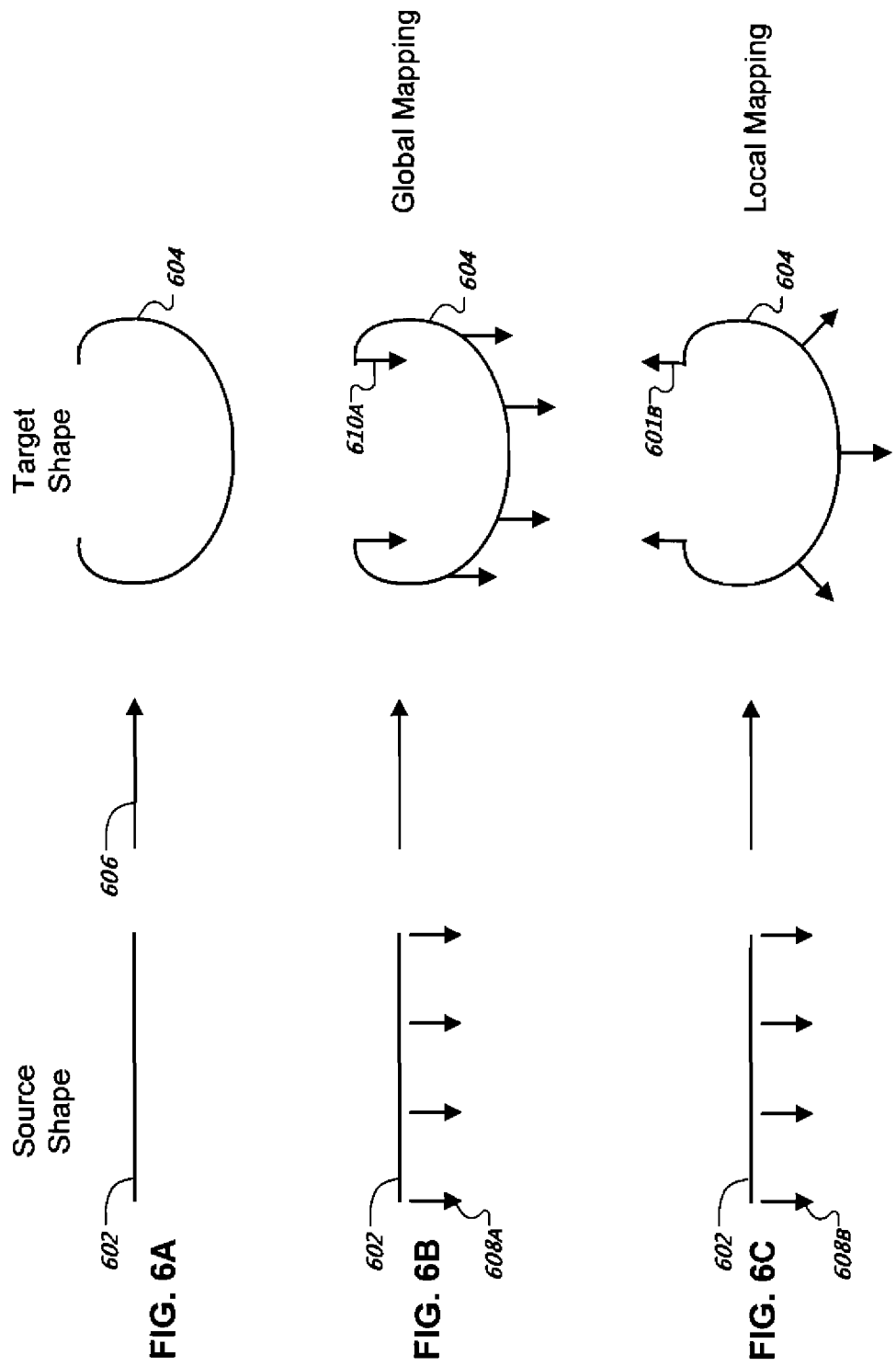
FIGS. 6A-C are examples of mapped movement vectors.

FIGS. 6A-C are examples of mapped movement vectors. FIG. 6A shows a source shape 602, such as a line used to define an actor's mouth. FIG. 6A also shows a corresponding target shape 604, which may represent a computer-generated character's mouth in an expression that corresponds (as indicated by the arrow 606) with the expression of the actor's mouth. For example, the source shape 602 may be the actor's mouth in an at-rest, or neutral, position. Similarly, the target shape 604 may be the character's mouth in a corresponding resting position.

FIG. 6B shows a downward displacement of the source shape 602, where a source displacement is indicated by the arrows 608A. If the movement is mapped relative to global features of the source object, for example, the movement is mapped as a downward movement relative to the entire actor's face, then a target displacement is also mapped as a downward movement because the movement is downward relative to the entire character's face (as indicated by the arrows 610A).

However, FIG. 6C shows mapping a displacement based on local features. For example, the source displacements 608B may be measured relative to a local neighborhood (e.g., surrounding vertices or polygons). Measured from this local neighborhood, the displacement may be expressed as an outward movement from the neutral position of the local features instead of a downward displacement relative to the actor's face.

When this localized outward displacement is mapped to the target shape 604, the corresponding target displacement is outward from the neutral position of a corresponding local neighborhood of the target shape 604 (as shown by the arrow 610B) instead of downward relative to the character's face.

Figure 7:
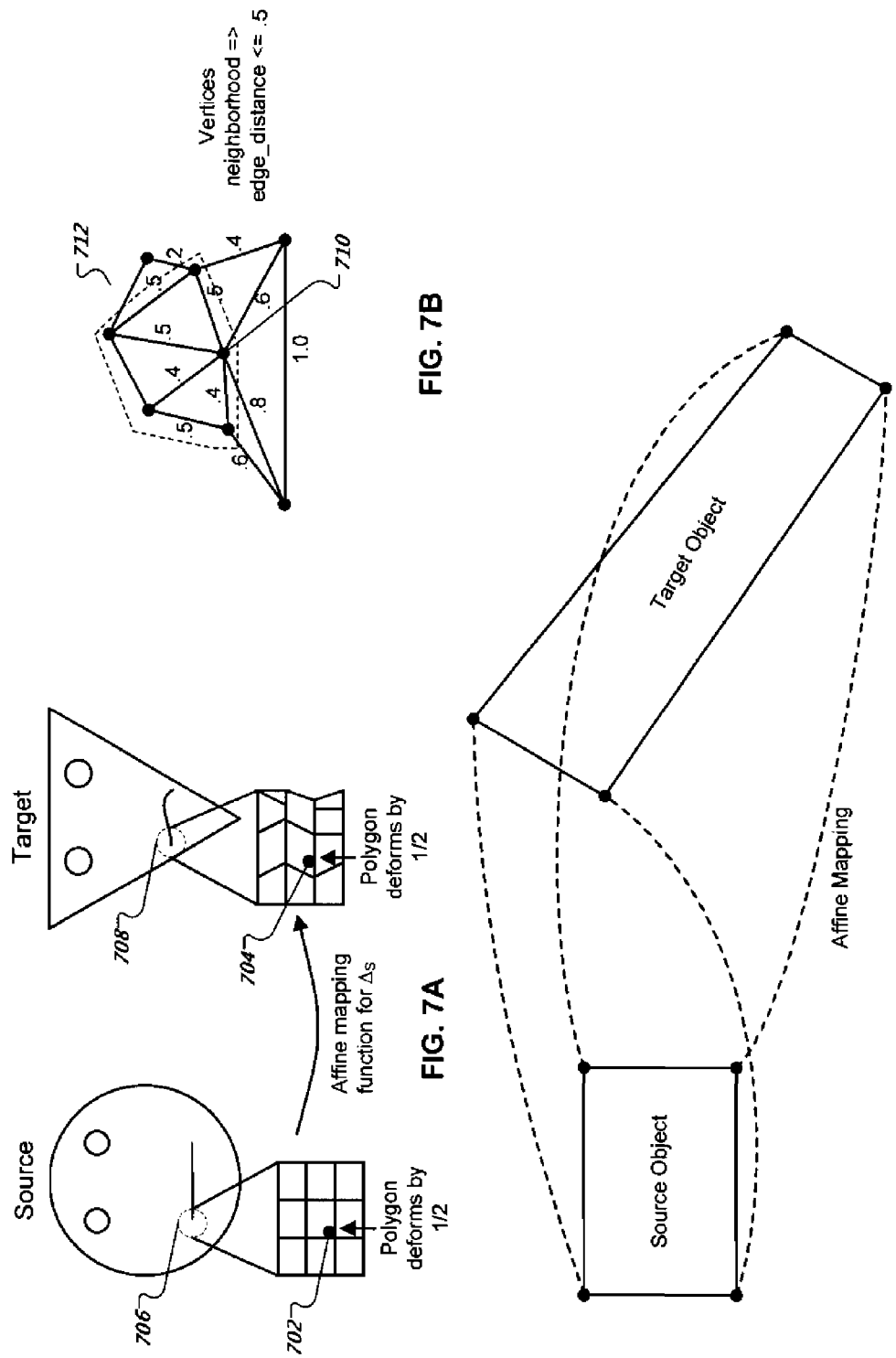
FIGS. 7A-C are examples illustrating local affine mapping of movement between the source and target objects.

FIGS. 7A-C are examples illustrating local affine mapping of movement between the source and target objects. FIG. 7A shows an affine mapping between a source point 702 and a target point 704 (both of which may be vertices on a mesh or points in-between vertices on the mesh).

A neighborhood 706 around the source point 702 may include polygons formed by vertices connected by edges. The target object of FIG. 7A has a corresponding neighborhood 708 around the target point 704. The source neighborhood 706 and the target neighborhood 708, however, are not required to have the same geometry (e.g., the shape and number of polygons within the neighborhoods may differ).

In certain implementations of local affine mapping, if the source neighborhood 706 deforms (e.g., by half), the target neighborhood 704 deforms by the same percentage (e.g., by half).

FIG. 7B illustrates how the neighborhood around a selected point is defined according to one implementation. The illustrative neighborhood is defined based on edge distance from a vertex. If the point of interest is a vertex 710, then vertices within a 0.5 edge distance are included in the neighborhood of the vertex 710 as indicated by a dashed line 712.

Movement of the vertex 710 is then measured relative to the other vertices within the neighborhood 712. In other implementations, movement of a point of interest is measured relative to polygons, or other geometric shapes, defined by the vertices and edges that are within the neighborhood 712.

FIG. 7C illustrates an affine mapping between a source and target object that have the same topology (e.g., number of vertices and edges), but different geometry (e.g., a positioning of the vertices and edges). In some implementations, this permits meshes that appear significantly different to be mapped to each other. As illustrated, polygons mapped between the source and target objects may be positioned, sized, and shaped differently.

In alternative implementations, the mapping may include a rigid mapping transformation and scaling. For example, the target mesh can include polygons that are the same shape as polygons in the source mesh, except that the target polygons are rotated and scaled (e.g., sized larger or smaller while maintaining the polygons' proportions).

Figure 8:
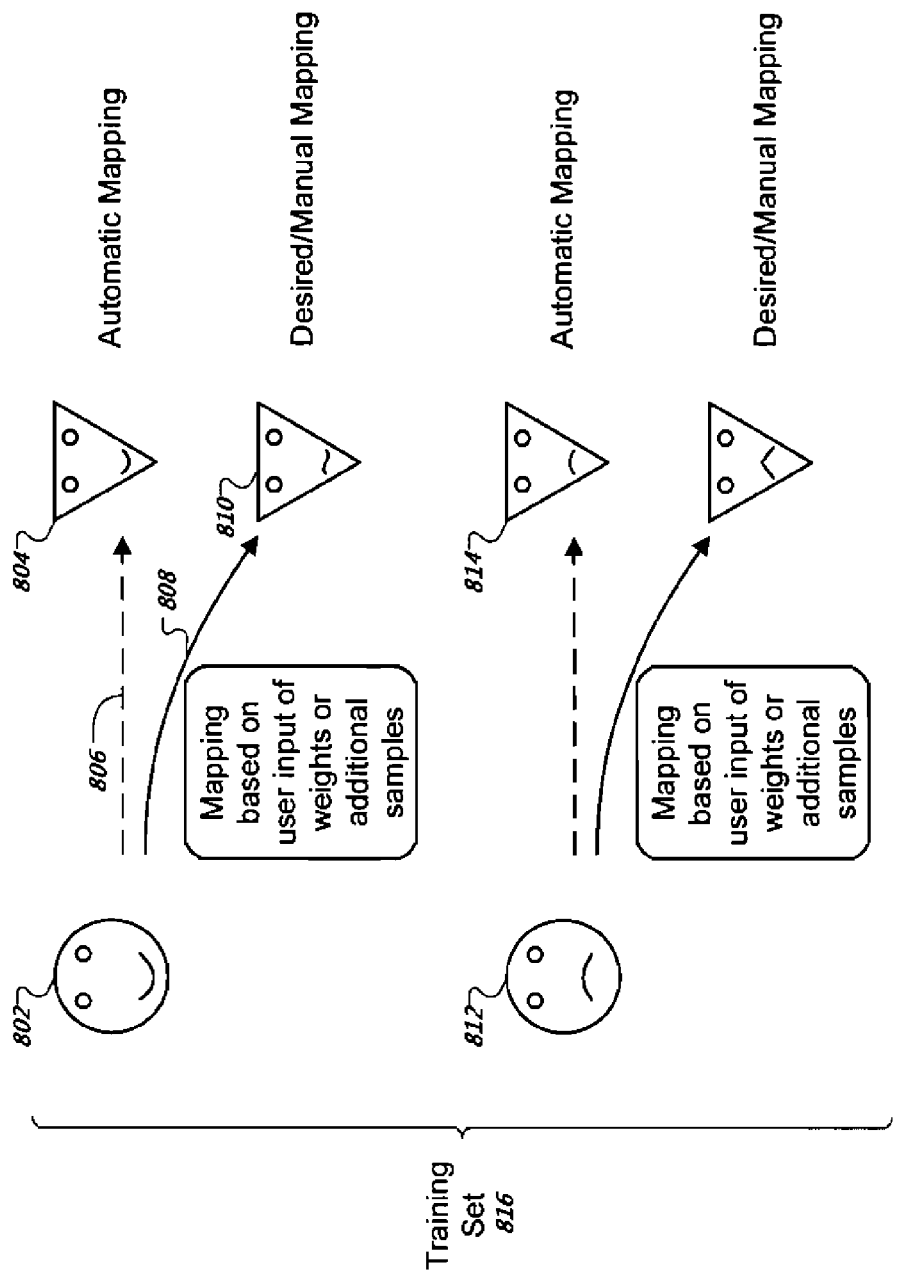
FIG. 8 is an example of manually refining mapped movement between the source and target objects.

FIG. 8 is an example of manually refining mapped movement between the source and target objects. As discussed in association with the steps 212 through 216 of FIG. 2, automatic mapping between the source and the target objects can be manually refined. The retargeting module 102 can map a source object with a smiling expression 802 to a target object with a corresponding smiling expression 804 as indicated by the dashed arrow 806. This mapping may then be displayed to a user. However, the target object may have a characteristic smile that deviates from the smiling expression 804.

In some implementations, the user can enter input to adjust weights that influence the contribution of samples in a training set of previous mappings used to generate the mapping 806. For example, the user may specify importance functions that weight the contributions of the samples in the training set.

The retargeting module 102 can then remap the smiling expression of the source object using a function derived from the modified training set as indicated by arrow 808. The refined smiling expression of the target object 810 can then be displayed to the user, who can accept the refined expression or modified the training set to further refine the mapping.

This process may be repeated for several expressions, such as the sad expression 812 of the source object which is mapped to a corresponding sad expression 814 of the target object.

The manually refined expression mapping can be added to the training set 816, which is used to derive additional mappings between the source and target objects.

FIG. 9 is an example of dynamically mapping previously unmapped movements between the source and target objects. In some implementations, the FIGs. and associated text that are described above are used to generate sample mappings for a training set, and the training set is used to dynamically generate new mappings of movement from the source object to the target object.

It may be impractical to require user intervention in mapping all possible expressions or positions that are captured for a source object. Building a finite set of sample mappings that are then used to dynamically create new mappings between the source and target objects can permit the system to animate the target object regardless of whether a matching mapping is stored in the training set.

For example, the retargeting module 102 can create twenty sample mappings between an actor's face and a computer-generated character's face. Each of the sample mappings may be refined so that the character's face maintains the desired characteristic expression or personality (e.g., the character's smile may curl at one side, whereas the actor's smile may curl at both sides).

The retargeting module 102 can then access motion capture information for the source object that has not been mapped, for example, the half smile expression 902. Using the previous mappings in the training set, the retargeting module 102 can derive a mapping between the source object in the target object.

When the mapping of the movement of the source object is applied to the target object, the mapped movement reflects the previous mappings in the training set. For example, if the training set includes a mapping where the target object has a smiling expression with one side of a character's face curling upwards more than the other side, the newly generated mapping can reflect this feature if the target object's expression is based on the smiling expression (e.g., the target object's expression is a half-smile.)

In some implementations, the derivation of the dynamic mapping described in association with FIG. 8 includes an extrapolation or interpolation of the previous mappings of the training set.

FIG. 10 is an example graph 1000 illustrating an interpolation of previous mappings to generate new mappings between the source and target objects. The graph 1000 includes a source axis 1002 used to quantify values associated with movements of a vertex on the source object. For example, one value is $S_1$, which corresponds to the vertex's position in an at-rest expression.

At $S_2$ the vertex has an increased value because it is associated with a different expression, such as a smirking expression, which requires a movement of the vertex from the position in the neutral expression. This movement, or delta, from the at-rest expression is quantified as $S_2$ in the graph 1000. Similarly, $S_3$ represents an additional value quantifying a movement of the vertex associated with another expression, such as a worried expression.

In the graph 1000, the values $S_1$-$S_3$ represent a vertex's position for previously mapped source object expressions stored in the training set.

The target axis 1004 and the values $T_1$-$T_3$ similarly represent a vertex's position, but the position is for previously mapped target object expressions.

Each value $S_1$-$S_3$ is mapped to a corresponding value $T_1$-$T_3$ that represents a corresponding vertex on the target object. For example, the value $S_1$ for an at-rest expression of the source object is mapped to $T_1$, which is a corresponding position of a vertex on the target object for the at-rest expression.

The mapped values for the movement of the vertex can be used to derive a function f(S) 1006, where $T_x$=f($S_x$). Using the function 1006, the retargeting module 102 can interpolate a value for $T_x$ based on a corresponding $S_x$. Similarly, if the given $S_x$ is not between two samples of the training set, the corresponding $T_x$ can be estimated by extrapolation.

For illustrative purposes, the example of FIG. 10 is a simplified interpolation in one-dimension, and is not intended to limit the number of dimensions used in the interpolation or extrapolation of dynamically derived mappings.

FIGS. 11 through 15 illustrate certain implementations that use information about a source object, such as states, to drive controls for a target object. A state for the source object, or a source state, can include a position of constituent components of the source object at a particular time or corresponding to a particular shape. For example, a first state may be defined by the presence of source vertices (or groups of source vertices) at a particular location. Additionally, the first state may be defined based on a shape of the source object, such as a facial expression. For example, the first state may be defined as a happy expression, where the mouth is up-turned and the eyes are wide open.

A state may also be defined as a condition of one or more of the constituent components, where the condition is based on displacements of the corresponding constituent components. In some implementations, each constituent component has a state. The state may indicate a displacement of the constituent component relative to a base or starting location for the constituent component. For example, a vertex in a facial mesh may have a base position defined by its location when a face has a neutral expression. If the facial mesh is modified to reflect motion capture data indicating the source object is smiling, the vertex in the facial mesh may move as well. The displacement of the vertex from the neutral expression to a smiling expression can define the first state. If the facial mesh is modified to reflect a half smile, the displacement may indicate a value of "0.5×first state."

In other implementations, the state for one or more constituent components can be expressed as a value within a predefined displacement range for the constituent components. For example, a group of vertices associated with a lower lip of a source object may move within a certain defined range for humans. In this example, the fullest extension of the range may be associated with the value "1," the fullest contraction may be associated with the value "−1," and the at rest position may be associated with the value "0." In some implementations, each of the values, "1," "−1," and "0" may be considered a state. In other implementations, the entire range can be considered a state, where each value within the state is associated with a faction of the state. For example, the value "0" (e.g., associated with a neutral position for the lower lip) may be associated with 50% of the full state, or 0.5 of state 1.

As mentioned previously, the source states can drive controls for the target object, or target controls. In some implementations, the target controls include abstracted components for the target object that permit an animation artist to manipulate underlying constituent components of the target object. For example, the target controls can be animated muscles, which an artist can control to manipulate groups of vertices that define a mesh for the target object. In some implementations, each control can be an individual muscle, or it may be a group of muscles, such as all the muscles used to control ear movement. In other implementations, the controls are associated with an expression or body position. For example, a control can influence the expression of a target face. If the control is linked to a happy expression, the artist may input values or other information to increase the happy expression (e.g., the lips can turn up, the eyes and nostrils widen, etc.). Additionally, various other controls are contemplated.

FIG. 11 is an example 1100 of information used for mapping a source object's geometry to a target object's controls. The first column 1102 labeled Vertices/Geometry State includes states based on a measured displacement of vertices or geometry of a source object. The second column labeled Mapping Function includes functions that are used to translate source states to corresponding values used to activate the target controls. The third column labeled Muscle Controls includes the muscle control values that result from the measured source states.

In the example 1100, State A may be a state associated with a 50% displacement of a set of vertices of a source object. The state can be input into a mapping function, for example, f(State A). The output of the mapping function can be an activation value for the control. For example, the mapping function can specify that Muscle A of the target object is associated with the set of vertices in State A. The input of State A into the mapping function may generate a constant $K_1$ that is used to activate the Muscle A an amount proportional to $K_1$.

In a substantially similar way, multiple states can be used by a mapping function to generate an activation value for one or more muscle controls. For example, a first set of vertices can have a displacement associated with State B and a second set of vertices can have a displacement associated with State C. The mapping function can use both State B and C as inputs to generate an activation value, e.g., $K_2$, for Muscle B, which is associated with both the first and second set of vertices.

Figure 12A:
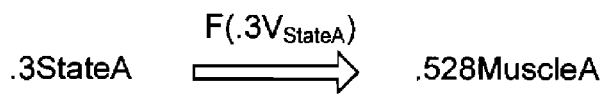
FIGS. 12A-C are examples of geometry mapped to controls.
Figure 12B:
Figure 12C:
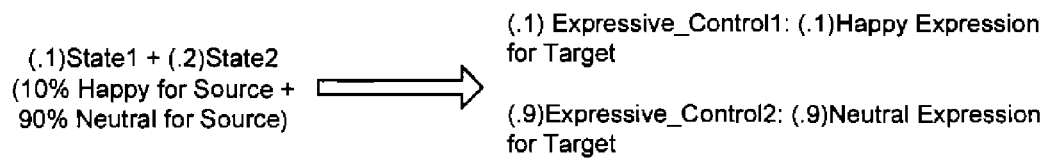

FIGS. 12A-C are examples of geometry mapped to controls. FIG. 12A shows a fraction of State A mapped to create an activation value for Muscle X. As discussed above, a state may be expressed as a range of displacement values for an individual vertex or group of vertices. In this example, State A could represent the range of possible displacement values for a group of vertices associated with a source object's upper lip. For example, the most extreme extension of the vertices could be expressed as 1.0 (State A) and the neutral position of the vertices could be expressed as 0.5. (State A). Referring to the FIG. 12A, if the vertices have a displacement associated with 0.3 (State A), a mapping function outputs an activation value of 0.528 for Muscle A, which can be interpreted as activating the muscle so that it is displaced approximately 50% of its full displacement range.

FIG. 12B shows an example where a displacement of a set of vertices causes multiple muscle controls to activate. In this example, the set of vertices is associated with both Muscle X and Muscle Y. A 33% displacement in the vertices set causes a 1% displacement in Muscle X and a 22% displacement in Muscle Y.

FIG. 12C shows an example where expressive states for a source object are mapped to expressive controls for a target object. In this example, the location of vertices can be associated with a particular expressive state or states. For example, the location of vertices for a source face may correspond to 10% of a happy expression (state 1) and 90% of a neutral expression (state 2). The mapping function can use the percentages and the states to output values used to adjust expressive controls for a target face. For example, the expressive controls can be linked to several facial muscles associated with an emotion, such as happiness. In this example, a state of 10% happiness is used to adjust an expressive control for happiness, and more specifically, the control is adjusted to 10% of its full range.

It is not necessary that the geometry or displacement of the geometry between the source and target objects be similar. For example, a 100% expression state may indicate a pronounced smile for a source, while an expressive control that is adjusted to 100% of its range may only correspond to a slightly raised upper lip for the target.

Figure 13A:
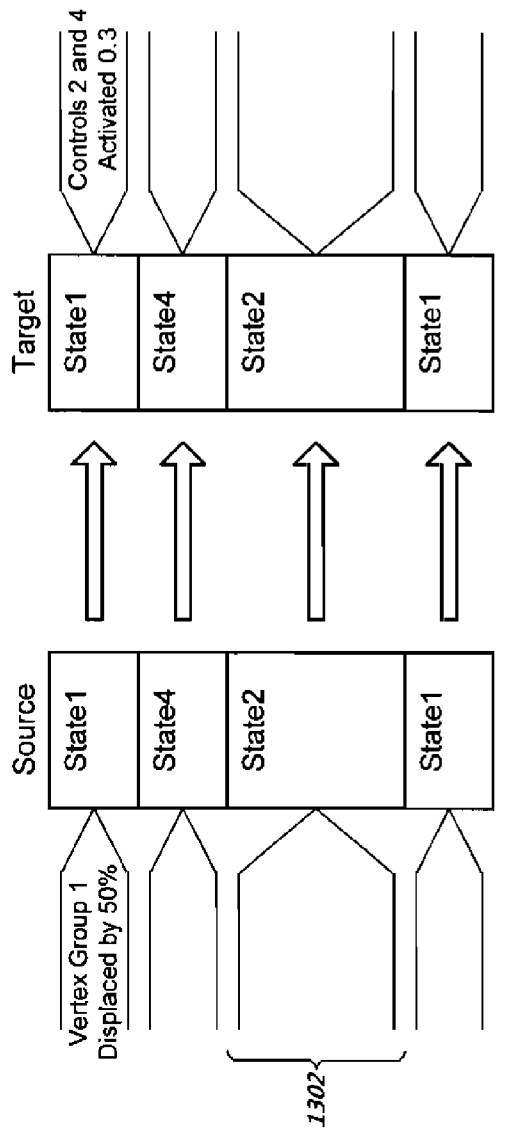
FIGS. 13A-B are examples of source states mapped to target states.

In certain implementations, the displacements of the source and the target can be insulated from each other by using state information instead of displacement information to transform a target object based on the source object. For example, FIG. 13A illustrates how timing and sequence of source states can be used to drive timing and sequence of target states. In this example, the source states are determined based on displacement of groups of vertices for the source object. The exemplary target states express the controls that are activated and the extent of the activation.

Referring to FIG. 13A, the source states occur in a sequence: State 1, State 4, State 2, and State 1. This information can be used to generate corresponding target states in the same sequence. In this example, the displacements of the vertices that produce source State 1 are not used to directly modify the shape of the target object. Instead, the occurrence of a state (or a fractional value for the full occurrence of the state), such as State 1, is used to modify the target shape by activating muscles on the target object.

In certain implementations, the length of time for which the source states occur drives the length of time that the corresponding target controls are active. Referring to FIG. 13A, source State 1 and target State 1 occur for approximately the same amount of time. Similarly source State 2, which occurs for a longer period than the other source states, is used to activate the target State 2 for this longer period of time, as indicated by the bracket 1302. In some implementations, the timing of the states may be related, but not by a one-to-one relationship. For example, the target state may be driven for half as long as the source state.

Figure 13B:
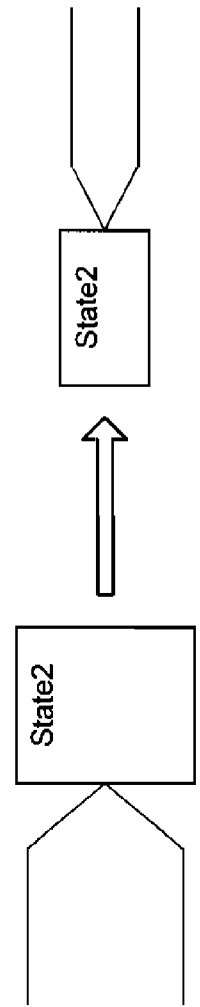

In other implementations, the timing of the source and target states can be independent. For example, as shown in FIG. 13B, the source state can last a first period of time, while the target state lasts a second period of time that can be, for example, set by an animation artist. The source states and the sequence of the source states can drive the target states and sequence, but an animation artist can specify the period for which the target state occurs.

Figure 14:
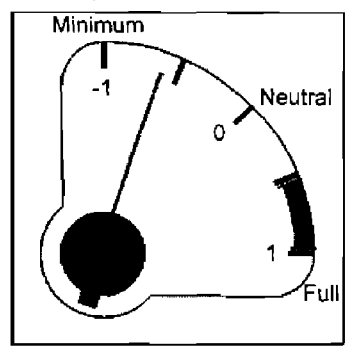
FIG. 14 is a schematic diagram of an exemplary user interface component for a shape's control.

FIG. 14 is a schematic diagram of an exemplary user interface component for a shape's control. An artist can "turn" the user interface component (displayed as a dial here) to modify a target object. In this example, the control affects the "sad" expression for a target face. If the control is turned toward the "full" setting, the target face exhibits more facial features associated with a sad expression, such as animated muscle contractions around the eyes and forehead and animated muscles that extend the lips downward. Although not shown in FIG. 14, as described previously, target controls also can manipulate individual muscles or groups of muscles (such as all the muscles required to move the tongue).

In some implementations, controls can be used by an animation artist to manipulate the target object after target states have been specified based on the source states. For example, an artist may wish to refine one or more of the target states. The initial target state based on the source state provides a starting point that may reduce the amount of manipulations that the artist makes to the target object.

Figures 15A, 15B:
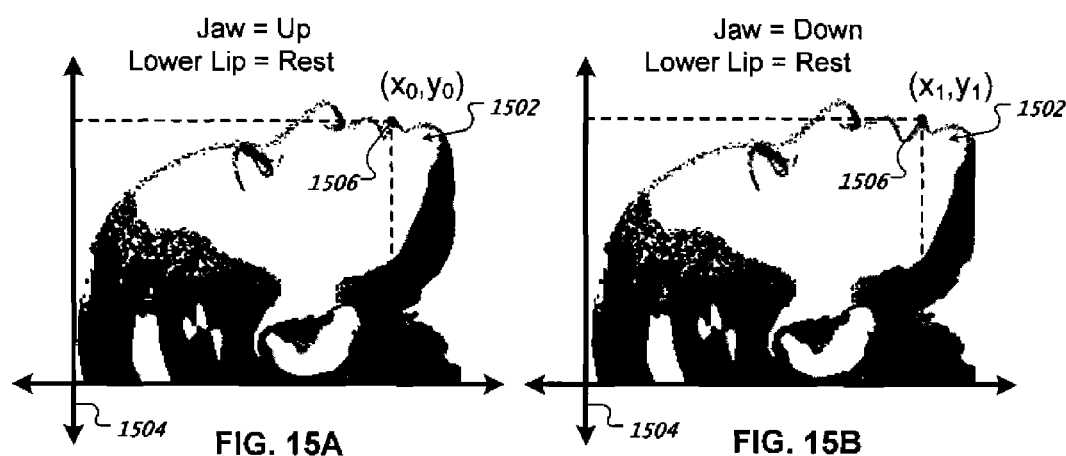
FIGS. 15A-D are examples of global and local coordinate systems used in determining displacement of a source object's geometry.

FIGS. 15A-D are examples of global and local coordinate systems used in determining displacement of a source object's geometry. FIGS. 15A and 15B show a source face 1502, where movement of points on the source face are determined relative to a global coordinate system 1504. The global coordinate system 1504 can be used to measure displacements for all points, such as vertex 1506, on the source object. In certain implementations, the global coordinate system 1504 can be defined independent of the source object (e.g., an axis of the coordinate system is not based on the position of one or more vertices of the source object).

If the global coordinate system 1504 is used, all displacements of vertices, including the displacements of vertices that are coupled (e.g., they typically move together) may be measured. This is illustrated in FIGS. 15A and 15B. The vertex 1506 on the lower lip has coordinates $(x_0, y_0)$ in FIG. 15A. In FIG. 15B, the jaw has moved down, and the vertex 1506 has changed in position to coordinates $(x_1, y_1)$ because its movement is coupled to the jaw. However, the lower lip is still in the same resting position as shown in FIG. 15A (e.g., the lower lip is not moving relative to the jaw).

Figures 15C, 15D:
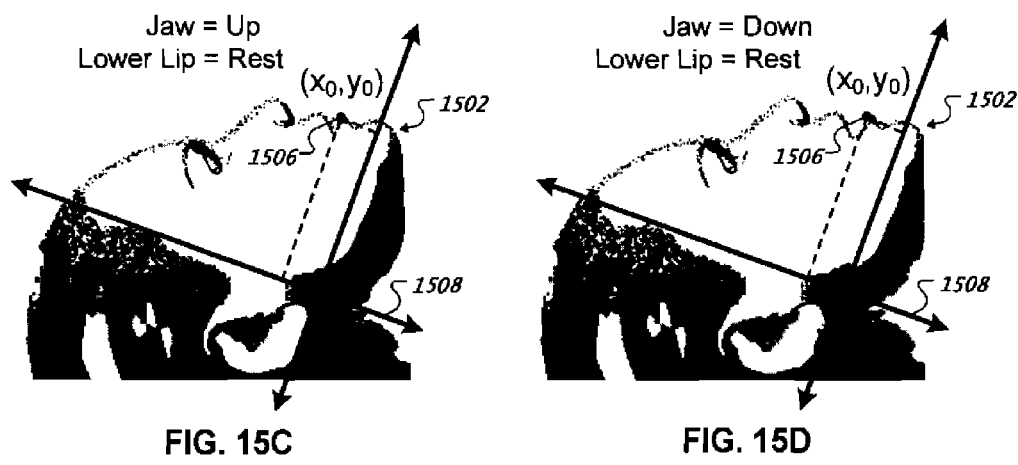

In some implementations, the measured movements of vertices can be decoupled by using a local coordinate system. For example, as shown in FIGS. 15C and 15D, the local coordinate system 1508 is based on one or more vertices forming the jaw of the source face 1502. The position of the vertex 1506 can be measured relative to the local coordinate system 1508, which enables the retargeting module to determine when the vertex 1506 has movement that is independent of the jaw, such as when the source object has a curled lower lip.

Referring to FIG. 15C, the position of the vertex 1506 on the lower lip has coordinates $(x_0, y_0)$. In FIG. 15D, the jaw has moved downward, but the vertex 1506 has the same coordinates $(x_0, y_0)$ because the vertex 1506 has not moved relative to the jaw (e.g., the lower lip is not moved in a smile, frown, snarl, etc.). This may permit the retargeting module 102 to decouple movements for points on the source object that have related movements. This can be used to reduce the amount of information used to determine, for example, a source state.

Figure 16:
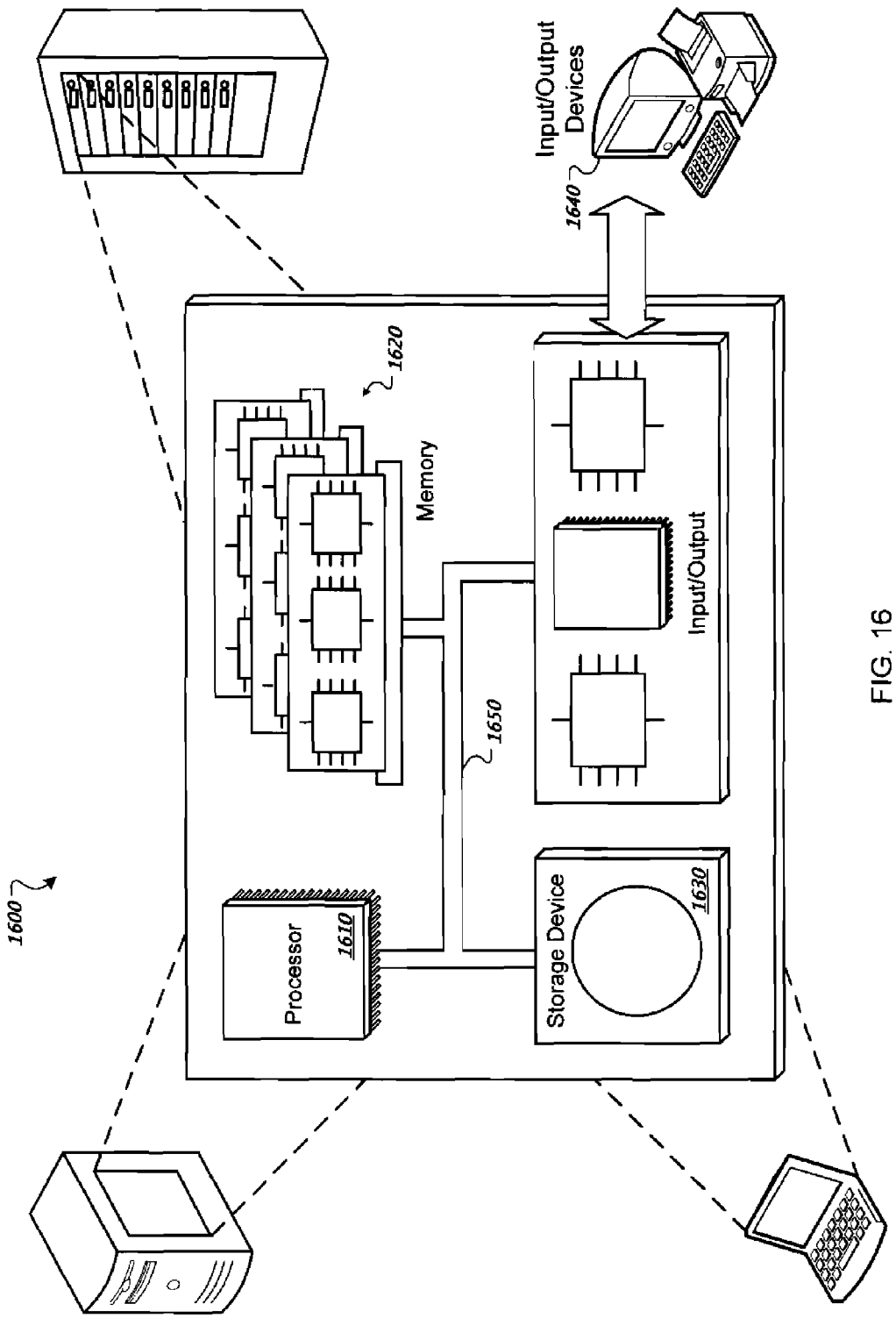
FIG. 16 is an example of a general computer system.

FIG. 16 is a schematic diagram of a computer system 1600. The system 1600 can be used for the operations described in association with any of the computer-implement methods described previously, according to one implementation. The system 1600 is intended to include various forms of digital computers, such as laptops, desktops, workstations, personal digital assistants, servers, blade servers, mainframes, and other appropriate computers. The system 1600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, as well as originating from motion capture techniques, the source information can also be procedurally generated, simulated, or "hand-animated" by an artist.

Also, although many of the examples described above are associated with facial retargeting, the systems and methods can be used other contexts, such as modifying animated mesh deformations. For example, the system can permit specifying sparse geometric corrections and interpolating/extrapolating the corrections in animations of arbitrary durations. This method can be used as an alternative to traditional key-framing.

In other implementations, the systems and methods can, of course, be used to retarget features other than facial features. For example, source shapes for joints (e.g., elbows, fingers, knees, etc.) can be retargeted to target shapes for corresponding joints.

In yet other implementations, the systems and methods can be used for retargeting source motion to target motion instead of or in addition to retargeting source shapes to target shapes. For example, a user could specify a timing or parameterization for paths taken by the target vertices based on the paths taken by the source vertices during motion.

In some implementations, retargeting motion from the source object to the target object can improve the target object's performance if significant remapping from source to target occurs. Additionally, retargeting motion may be useful when creating or reducing characteristic motions that are mapped from the source object to the target object because the movement that creates the characteristic motion for the source object can be substantially duplicated for the target object by specifying the paths and timing of movement for the target vertices based on the source vertices.

In other implementations, the described training set is modified based on computer-implemented procedures instead of or in addition to user input. For example, the initial training set that includes shapes based on one actor's performance can be supplemented with shapes based on additional actors' or actresses' performances. Corresponding shapes (e.g., the position of a face during a smiling expression) from two or more performers can be used so that retargeting takes into account both shapes.

For example, the source-to-target mapper 122 can generate a composite smiling expression for the training set based on smiling expressions from multiple performers. This composite smiling expression can then be used for retargeting to the target object. In another example, smiling expressions from the same actor performed at different times can be used to create a refined training set.

In yet other implementations, the above described system can be used while working with multiple base, or rest, poses. For example, the change in position for the source vertices can be expressed relative to more than one source shape.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
a display;
an input device;
one or more processors operatively coupled to the display and the input device; and
a memory coupled with and readable by the one or more processors and storing therein a set of instructions which, when executed by the one or more processors, cause the one or more processors to:
receive a training set comprising a plurality of source-to-target mappings, wherein each source-to-target mapping corresponds to a respective state of a source object and a respective state of a target object, and wherein each source-to-target mapping comprises a unique transformation function that determines how movement information of the source object relative to a baseline position of the source object is transformed to produce movement information of the target object from a baseline position of the target object;
receive specified movement information for the source object from the baseline position of the source object;
generate, from the training set and the specified movement information for the source object, a corresponding transformation function that determines how the specified movement information of the source object is transformed to obtain a corresponding movement information specifying movement of the target object from the baseline position of the target object;
apply the generated transformation function to the specified movement information for the source object to obtain the corresponding movement information for the target object; and
create a transformed target object comprising the baseline position of the target object displaced by the corresponding movement information.

2. The system set forth in claim 1 wherein:
the source object comprises a source mesh;
the target object comprises a target mesh; and
the movement information comprises vectors relative to components of a baseline mesh representing the baseline position of the source object.

3. The system set forth in claim 2 wherein the transformation function maps displacements of the source mesh onto displacements of the target mesh at a given time.

4. The system of claim 2, wherein at least one of the vectors is specified with respect to a local coordinate system for a component of the source object.

5. The system set forth in claim 1 wherein the instructions further cause the one or more processors to:
display the transformed target object on the display along with at least one control associated with a state of the source object that enables a user to modify the transformed target object using the input device;
in response to input received from the input device that adjusts the at least one control, modify the transformed target object to create a modified target object;
display the modified target object on the display; and
modify the training set based at least in part on the modified target object.

6. The system set forth in claim 5 wherein a first control of the at least one control comprises an abstracted component of the transformed target object that permits a user to manipulate underlying constituent components of the transformed target object.

7. A non-transitory computer-readable memory storing a plurality of instructions executable by one or more processors, the plurality of instructions comprising:
instructions to receive a training set comprising a plurality of source-to-target mappings, wherein each source-to-target mapping corresponds to a respective state of a source object and a respective state of a target object, and wherein each source-to-target mapping comprises a unique transformation function that determines how movement information of the source object relative to a baseline position of the source object is transformed to produce movement information of the target object from a baseline position of the target object;
instructions to receive specified movement information for the source object from the baseline position of the source object;
instructions to generate, from the training set and the specified movement information for the source object, a corresponding transformation function that determines how the specified movement information of the source object is transformed to obtain a corresponding movement information specifying movement of the target object from the baseline position of the target object;
instructions to apply the generated transformation function to the specified movement information for the source object to obtain the corresponding movement information for the target object; and
instructions to create a transformed target object comprising the baseline position of the target object displaced by the corresponding movement information.

8. The non-transitory computer-readable memory set forth in claim 7 wherein:
the source object comprises a source mesh;
the target object comprises a target mesh; and
the movement information comprises vectors relative to components of a baseline mesh representing the baseline position of the source object.

9. The non-transitory computer-readable memory set forth in claim 8 wherein the transformation function maps displacements of the source mesh onto displacements of the target mesh at a given time.

10. The non-transitory computer-readable memory of claim 8, wherein at least one of the vectors is specified with respect to a local coordinate system for a component of the source object.

11. The non-transitory computer-readable memory of claim 7, the plurality of instructions further comprising:
instructions to display the transformed target object on the display along with at least one control associated with a state of the source object that enables a user to modify the transformed target object using the input device;
instructions that, in response to input received from the input device that adjusts the at least one control, modify the transformed target object to create a modified target object;
instructions to display the modified target object on the display; and
instructions to modify the training set based at least in part on the modified target object.

12. The non-transitory computer-readable memory set forth in claim 11 wherein a first control of the at least one control comprises an abstracted component of the transformed target object that permits a user to manipulate underlying constituent components of the transformed target object.

13. A method comprising:
receiving, by one or more processors, a training set comprising a plurality of source-to-target mappings, wherein each source-to-target mapping corresponds to a respective state of a source object and a respective state of a target object, and wherein each source-to-target mapping comprises a unique transformation function that determines how movement information of the source object relative to a baseline position of the source object is transformed to produce movement information of the target object from a baseline position of the target object;
receiving, by the one or more processors, specified movement information for the source object from the baseline position of the source object;
generating, by the one or more processors and from the training set and the specified movement information for the source object, a corresponding transformation function that determines how the specified movement information of the source object is transformed to obtain a corresponding movement information specifying movement of the target object from the baseline position of the target object;
applying, by the one or more processors, the generated transformation function to the specified movement information for the source object to obtain the corresponding movement information for the target object; and
creating, by the one or more processors, a transformed target object comprising the baseline position of the target object displaced by the corresponding movement information.

14. The method set forth in claim 13 wherein:
the source object comprises a source mesh;
the target object comprises a target mesh; and
the movement information comprises vectors relative to components of a baseline mesh representing the baseline position of the source object.

15. The method set forth in claim 14 wherein the transformation function maps displacements of the source mesh onto displacements of the target mesh at a given time.

16. The method of claim 14, wherein at least one of the vectors is specified with respect to a local coordinate system for a component of the source object.

17. The method set forth in claim 13 wherein the transformation function is determined by interpolating between multiple states of the source object in the training set.

18. The method of claim 13, further comprising:
displaying the transformed target object on the display along with at least one control associated with a state of the source object that enables a user to modify the transformed target object using the input device;
in response to input received from the input device that adjusts the at least one control, modifying the transformed target object to create a modified target object;
displaying the modified target object on the display; and
modifying the training set based at least in part on the modified target object.

19. The method set forth in claim 18 wherein a first control of the at least one control comprises an abstracted component of the transformed target object that permits an animation artist to manipulate underlying constituent components of the transformed target object.

20. The method set forth in claim 18 wherein a first control of the at least one control adjusts a percentage contribution of an expression of a face of the modified target object.

21. The method set forth in claim 18 wherein a first control of the at least one control manipulates an individual muscle or group of muscles of a face of the modified target object.

22. The method set forth in claim 13 wherein the target object comprises a face of a computer-generated character.

23. The method set forth in claim 13 wherein the movement information is generated from motion capture data.

* * * * *